UNITED STATES PATENT OFFICE.

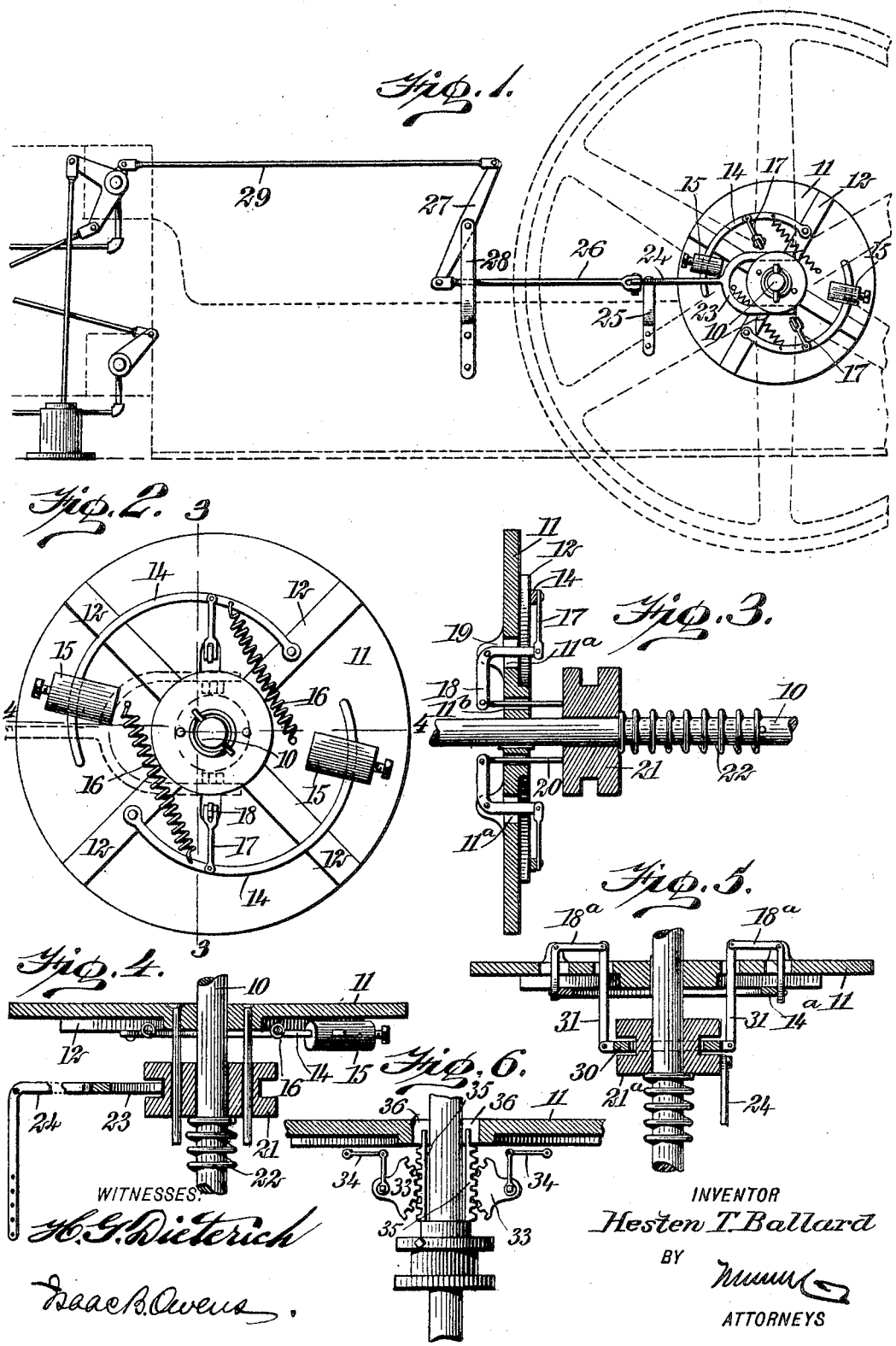

HESTEN TITUS BALLARD, OF YOUNGSTOWN, OHIO.

GOVERNOR MECHANISM.

No. 812,630.  Specification of Letters Patent.  Patented Feb. 13, 1906.

Application filed September 26, 1905. Serial No. 280,164.

*To all whom it may concern:*

Be it known that I, HESTEN TITUS BALLARD, a citizen of the United States, and a resident of Youngstown, in the county of Mahoning and State of Ohio, have invented a new and Improved Governor Mechanism, of which the following is a full, clear, and exact description.

The invention relates particularly to a governor mechanism for Corliss engines; and the object of the invention is to provide an efficient mechanism applied to the fly-wheel or shaft of the engine by which to regulate the valve mechanism. This end I attain by certain peculiar features of construction and arrangement of parts which will be fully set forth hereinafter.

Reference is to be had to the accompanying drawings, which illustrate several manners in which my invention may be practically employed, in which—

Figure 1 is a side view of the complete mechanism. Fig. 2 is an enlarged view of the governor proper. Fig. 3 is a section on the line 3 3 of Fig. 2. Fig. 4 is a section on the line 4 4 of Fig. 2, and Fig. 5 is a section showing a slight modification.

Referring to Figs. 1 to 4, 10 indicates the crank-shaft of the engine, to which is keyed or otherwise fastened a wheel or disk 11. This disk is provided with radial ribs 12, set away from the face of the disk. Preferably four of such ribs are employed arranged at equidistant points from each other. Pivoted to two diametrically opposed ribs 12 are the swinging governor-arms 14, in which are arranged adjustable weights 15. 16 indicates springs which hold the governor-arms normally inward. Said arms are connected by links 17 with elbow-levers 18. The elbow-levers are fulcrumed on brackets 19, projecting from the face of the disk 11 opposite that having the ribs 12, and the elbow-levers have one arm projecting through openings 11ª in the disk and the other arms extending inward radially, as shown in Fig. 3. To the inwardly-projecting arms of the elbow-levers 18 rods 20 are joined, and these extend parallel to the crank-shaft 10 through openings 11ᵇ in the disk 11 and engage a collar 21, which is loose on the crank-shaft. 22 indicates a spring for pressing the collar 21 toward the disk 11.

As shown in Figs. 1 and 2, the collar is formed with an annular groove, which is embraced by a fork 23 on an elbow-lever 24. This lever is fulcrumed on a bracket 25, suitably fastened to the frame of the engine, and carries at the end opposite the fork a link 26, which in turn is pivoted to a lever 27, supported on a bracket 28, also mounted on the engine-frame. The lever 27 is in connection with the Corliss valve-gear by means of a link 29, as shown in Fig. 1.

As the governor-arms 14 swing outward under the influence of centrifugal force, the elbow-levers 18 are actuated to push outward the collar 21 through the medium of the rods 20. Said collar actuates the elbow-lever 24, and this lever through the parts 27, 28, and 29 affects the valve-gear.

The modification of the invention shown in Fig. 5 relates to the manner of operating the collar 21ª. In this form of the invention the groove in the collar receives a ring 30, with which are connected links 31. These links are joined to elbow-levers 18ª, fulcrumed on the disk 11, and engaged by the governor-arms 14ª, as illustrated. The elbow-lever 24ª is pivoted or otherwise joined to the collar 21ª, so as to receive its motion from the collar. It will be seen that this mechanism provides for the application to the Corliss gear of a fly-wheel or shaft-governor, thus providing for closer regulation of the engine.

In Fig. 6 sectors 33 are employed for shifting the collar. The sectors have links 34 for connecting them with the arms 14, and said sectors mesh with racks 35, fastened to the collar and sliding through orifices 36 in the disk 11. The disk is fastened to the shaft, as before described.

Having thus described the preferred form of my invention, what I claim as new, and desire to secure by Letters Patent, is—

1. The combination with a Corliss engine, of a governor-disk having ribs extending along one side of the face thereof, governor-arms mounted on the disk and arranged to slide against the ribs, weights attached to the governor-arms and located between the ribs, a spring actuating the governor-arms in one direction, an elbow-lever fulcrumed on the disk at the side bearing the arm, one arm of the elbow-lever projecting through the disk, a link connecting one arm of the elbow-lever with the governor-arm, a rod in connection with the other arm of the elbow-lever, and projecting through the disk, a collar loose on the shaft and rotated by the arm, a spring pressing the collar, and a connection between the collar and the valve-gear of the engine.

2. The combination with a Corliss engine, of a governor-disk mounted on the shaft of the engine, a governor-arm mounted to swing on the disk, a spring actuating the arm in one direction, an elbow-lever fulcrumed on the disk at the side bearing the arm, one arm of the elbow-lever projecting through the disk, a link connecting said arm of the elbow-lever with the governor-arm, a rod in connection with the other arm of the elbow-lever and projecting through the disk, a collar loose on the shaft and engaged by the arm, a spring pressing the collar, and means engaged with the collar for transmitting the movement thereof.

3. The combination with a Corliss engine, of a governor-disk mounted on the shaft of the engine, a governor-arm mounted to swing on the disk, a spring actuating the arm in one direction, an elbow-lever fulcrumed on the disk at the side bearing the arm, one arm of the elbow-lever projecting through the disk, a link connecting said arm of the elbow-lever with the governor-arm, a rod in connection with the other arm of the elbow-lever and projecting through the disk, a collar loose on the shaft and engaged by the arm, a spring pressing the collar, and means engaged with the collar for transmitting the movement thereof, said disk having ribs on the side bearing the governor-arms, and the governor-arms engaging the ribs.

4. A governor comprising a wheel or disk having ribs extending along one side face thereof, governor-arms mounted on the wheel and arranged to slide against said ribs, weights attached to the governor-arms and located between the ribs, and means for transmitting the movement of the governor-arms.

In testimony whereof I have signed my name to this specification in the presence of two subscribing witnesses.

HESTEN TITUS BALLARD.

Witnesses:
D. B. McDONALD,
J. A. McDONALD.